(12) United States Patent
Sano et al.

(10) Patent No.: US 7,405,390 B2
(45) Date of Patent: Jul. 29, 2008

(54) POSITION DETECTION SYSTEM

(75) Inventors: Masahito Sano, Fuji (JP); Tsuyoshi Takanose, Fuji (JP); Akiko Numata, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 77 days.

(21) Appl. No.: 11/593,161

(22) Filed: Nov. 3, 2006

(65) Prior Publication Data
US 2007/0102627 A1 May 10, 2007

(30) Foreign Application Priority Data
Nov. 9, 2005 (JP) ............................. 2005-324960

(51) Int. Cl.
G06M 7/00 (2006.01)
G01N 21/86 (2006.01)

(52) U.S. Cl. ................................. 250/221; 250/559.29

(58) Field of Classification Search ................. 250/221, 250/559.29; 340/500, 540, 541, 552, 555–557; 901/46, 47; 702/207
See application file for complete search history.

(56) References Cited

U.S. PATENT DOCUMENTS
6,498,338 B2 * 12/2002 Oosterling et al. .......... 250/221
6,727,511 B2 * 4/2004 Cusick et al. .......... 250/559.29

FOREIGN PATENT DOCUMENTS
JP         2003-302469         10/2003

* cited by examiner

*Primary Examiner*—Que Le
*Assistant Examiner*—Pascal M Bui-Pho
(74) *Attorney, Agent, or Firm*—Harness, Dickey & Pierce, P.L.C.

(57) ABSTRACT

A plurality of optical beacons that emit light in respective light emitting patterns containing an ID code are distributed and installed in a space in which of a mobile body are moved. The mobile body is provided with a detection unit. The detection unit identifies at least three optical beacons according to the ID codes of the lights emitted according to the optical beacons and detects the direction of light emitted according to each of the identified optical beacons. Then, it detects the position of the mobile body according to the outcome of detection.

14 Claims, 9 Drawing Sheets

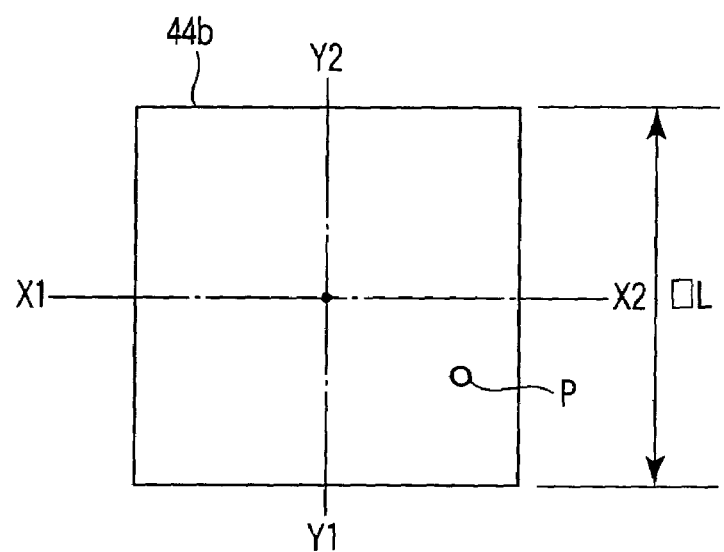
F I G. 11
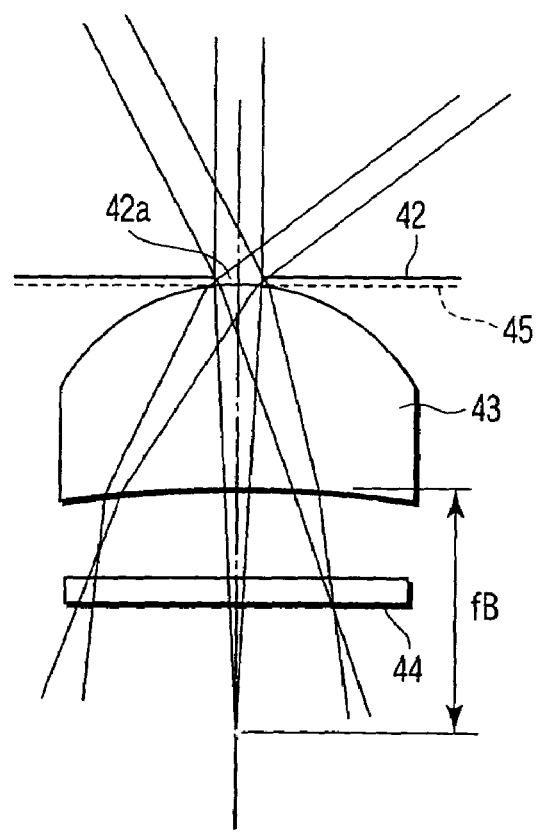
F I G. 12

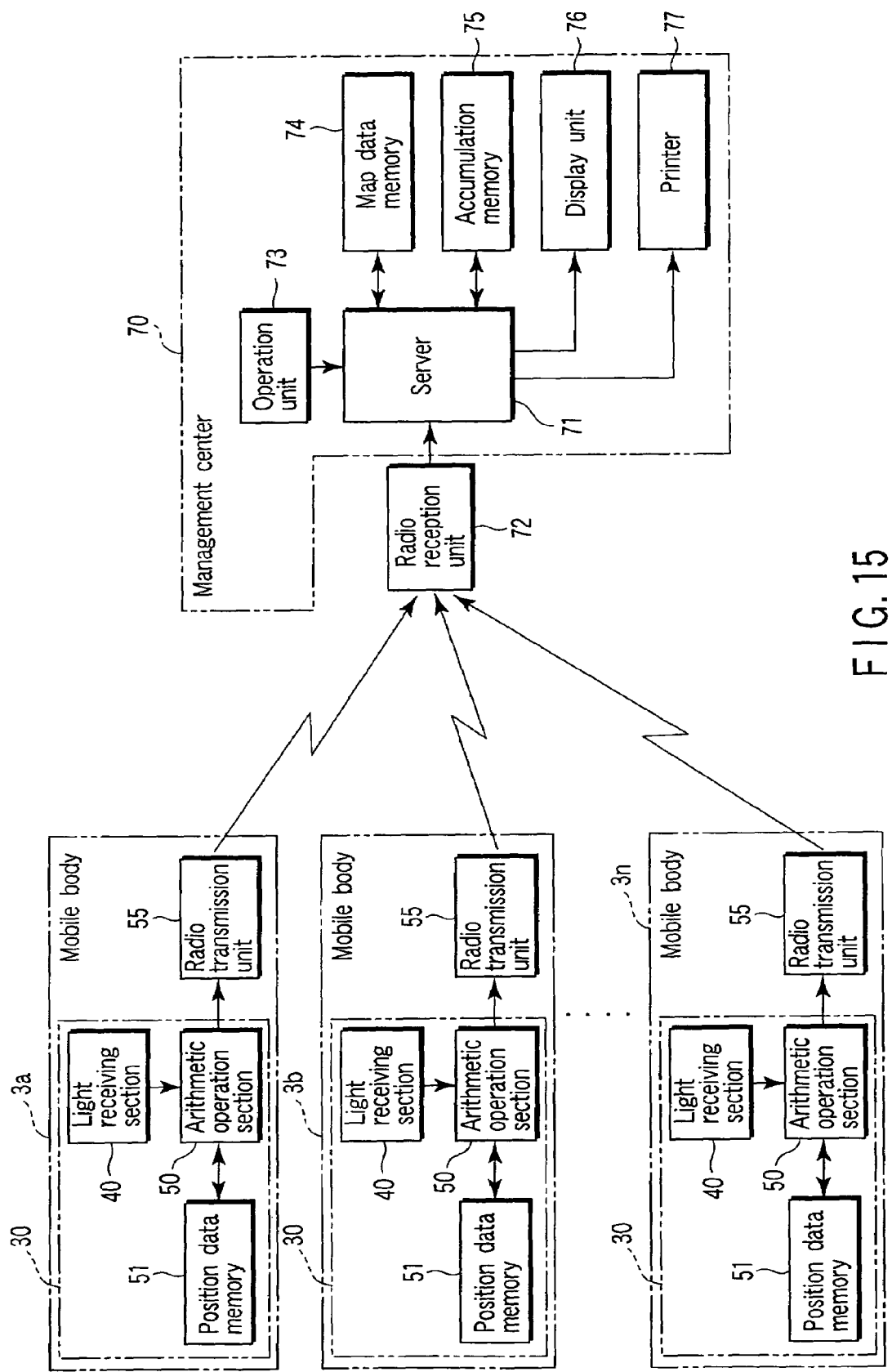
F I G. 15

POSITION DETECTION SYSTEM

CROSS-REFERENCE TO RELATED APPLICATIONS

This application is based upon and claims the benefit of priority from prior Japanese Patent Application No. 2005-324960, filed Nov. 9, 2005, the entire contents of which are incorporated herein by reference.

BACKGROUND OF THE INVENTION

1. Field of the Invention

This invention relates to a position detection system for detecting the position of a mobile body in the space in which of the mobile body is moved.

2. Description of the Related Art

Systems of arranging a rotary-type laser radar on a mobile body to know the position of the mobile body, anchoring at least three reflectors in a space surrounding the mobile body and scanning the surroundings of the mobile body by means of a laser beam emitted from the laser radar are known (see, for example, Jpn. Pat. Appln. Publication No. 2003-302469).

With such a system, it is possible to detect the presence or absence of light reflected from each of the reflectors as a result of scanning with a laser beam and also the direction of each of the reflectors as viewed from the mobile body according to the information on the scanning angle of the laser beam. Additionally, it is possible to detect the distance between the mobile body and each of the reflectors by gauging the time spent for the laser beam to be reflected by the reflector and returning to the laser radar. Then, it is possible to detect the position of the mobile body according to the detected direction and the detected distance.

However, with the above-described system, after anchoring the reflectors in a space surrounding the mobile body, it is necessary to emit a laser beam, placing the mobile body at a fixed point, and carry out various operations of calibration/ registration relative to the mobile body for initialization according to light reflected from each of the reflectors. The initialization is a cumbersome operation for the operator. The cumbersomeness is multiplied when there is a plurality of mobile bodies because it is necessary to carry out the operations of initialization for each mobile body.

Additionally, the above-described system is accompanied by a problem that the mobile body becomes large, can malfunction and involves large cost because a rotary-type laser radar needs to be arranged on the mobile body.

BRIEF SUMMARY OF THE INVENTION

Therefore, it is the object of the present invention to provide a position detection system that can accurately detect the position of one or more mobile bodies without requiring cumbersome operations of initialization for the one or more mobile bodies and arranging a rotary-type laser radar on the mobile one or more bodies.

In an aspect of the present invention, the above object is achieved by providing a position detection system comprising:

a plurality of light emitting sections distributed in the space in which of one or more mobile bodies are moved and adapted to emit light sequentially in respective light emission patterns containing respective specific pieces of identification information; and one or more detection sections arranged in the mobile body or respectively in the mobile bodies, which identify at least three of the light emitting sections according to the identification information contained in the light emitted from each of the light emitting sections, detect the direction of light emitted from each of the identified light emitting sections, and detect the position of the mobile body or respectively the mobile bodies according to the direction of light emitted;

wherein at least one of the light emitting sections emits light upon receiving light from any other light emitting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a schematic illustration of a condensed light spot formed on the position sensor of the third embodiment;

FIG. 12 is a schematic illustration of a principal part of the light receiving section of the detection unit of the fourth embodiment, showing the configuration thereof;

FIG. 15 is a schematic block diagram of the control circuit of the entire seventh embodiment.

DETAILED DESCRIPTION OF THE INVENTION

[1] A first embodiment of the present invention will be described by referring to the related drawings.

Figure 1:
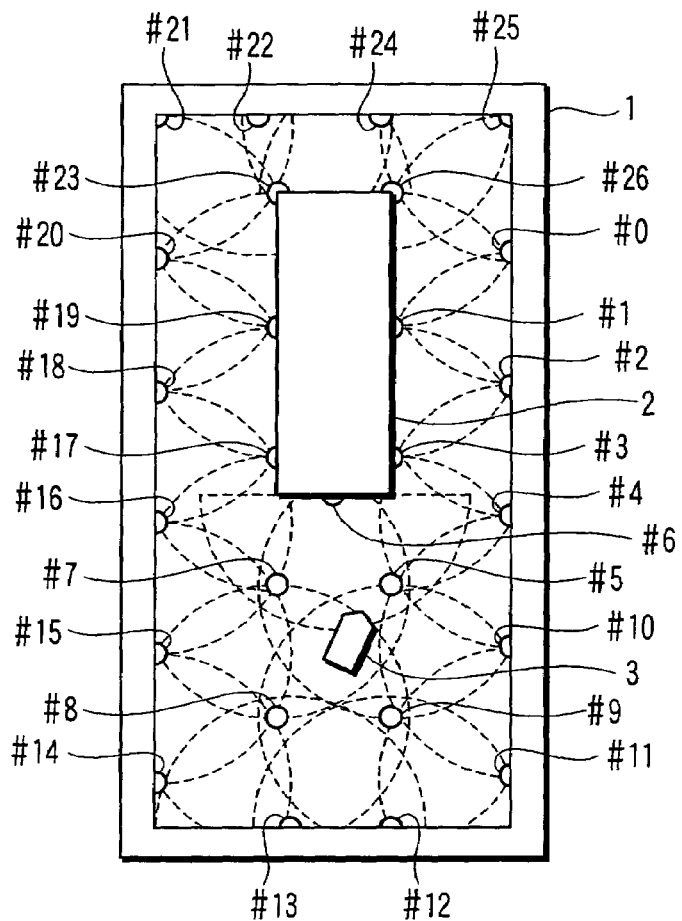
FIG. 1 is a schematic illustration of the entire configuration of each embodiment.

FIG. 1 is a schematic plan view of the inside of a building, which may be a large shop. In FIG. 1, 1 denotes the building that (the inside of which) is defined by a floor, walls and a ceiling and has a shelf 2 in the inside. A mobile body 3 can freely move on the floor of the building 1.

At least not less than 3 light emitting means, for instance, a total of 27 optical beacons #0 through #26, are distributed and installed on an upper part of the inner wall of the building 1, in an upper part of the shelf 2 and on the ceiling. The optical beacons #0 through #26 respectively have light emitting diodes adapted to emit infrared rays as light emitting elements. The anchoring positions (plane coordinates) of the optical beacons #0 through #26 are stored in the position data memory of the detection unit, which will be described hereinafter, arranged in the mobile body 3.

Of the optical beacons #0 through #26, infrared rays emitted from each of those that are fitted to the wall surfaces extend downwardly and laterally within a range of 180° at maximum on a plan view (90° or 270° for those that are fitted at the corners) while infrared rays emitted from each of those that are fitted to the ceiling extend downwardly within a whole range of a plan view.

Particularly, each of the optical beacons #1 through #26 that are located at respective positions is found within a region that can receive light emitted from at least one of the optical beacons other than itself.

Figure 2:
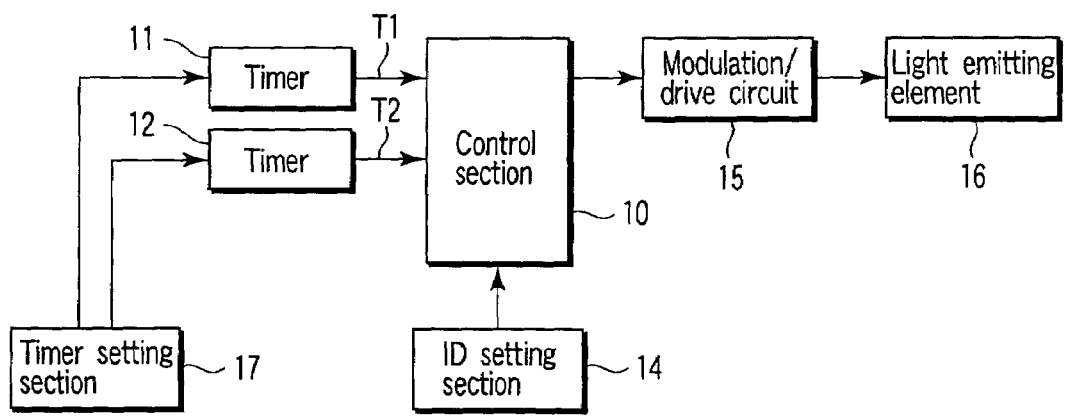
FIG. 2 is a schematic block diagram of the control circuit of the first optical beacon in the light emitting sequence of each embodiment.

Of the optical beacons #0 through #26, the first optical beacon #0 in the light emitting sequence operates to emit light periodically and comprises a control circuit as illustrated in FIG. 2. More specifically, timers 11, 12, an ID setting section 14 and a modulation/drive circuit 15 are connected to the control section 10 of the optical beacon.

The timer 11 counts for a predetermined time T1 for defining the periodical light emitting operation of the optical beacon #0. The timer 12 counts for another predetermined time T2 for performing a light emitting operation for detecting the direction of the optical beacon #0. The ID setting section 14 is a section for variably setting identification information, or so-called ID, specific to the optical beacon #0 by way of a manual operation. The modulation/drive circuit 15 modulates a carrier signal of a predetermined frequency under the control of the control section 10 and causes the light emitting element (light emitting diode) 16 to emit light by means of the modulated signal (pulse signal).

Figure 3:
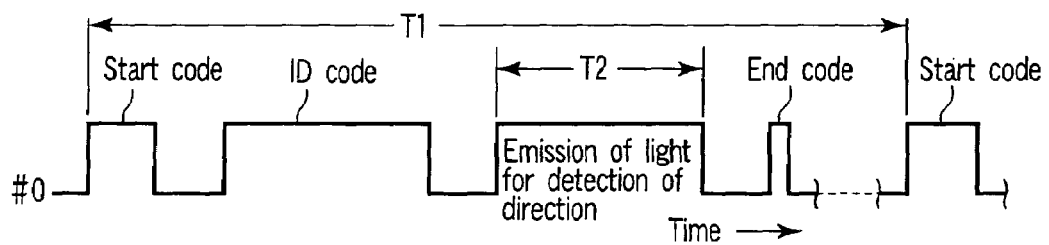
FIG. 3 is a timing chart illustrating the light emitting operation of the first optical beacon in the light emitting sequence of each embodiment.

FIG. 3 is a timing chart of the light emitting operation of the optical beacon #0 under the control of the control section 10.

Referring to FIG. 3, the optical beacon #0 firstly emits light with a light emission pattern (on/off pattern) containing a start code in every predetermined time T1 according to the count of the timer 11, then emits light with a light emission pattern containing the ID code, subsequently continuously emits light for a predetermined time T2 according to the count of the timer 12 for detection of direction and finally emits light with a light emission pattern containing an end code. The emission of light for detection of direction is for allowing the mobile body 3 to reliably detect the direction of the optical beacon #0.

Figure 4:
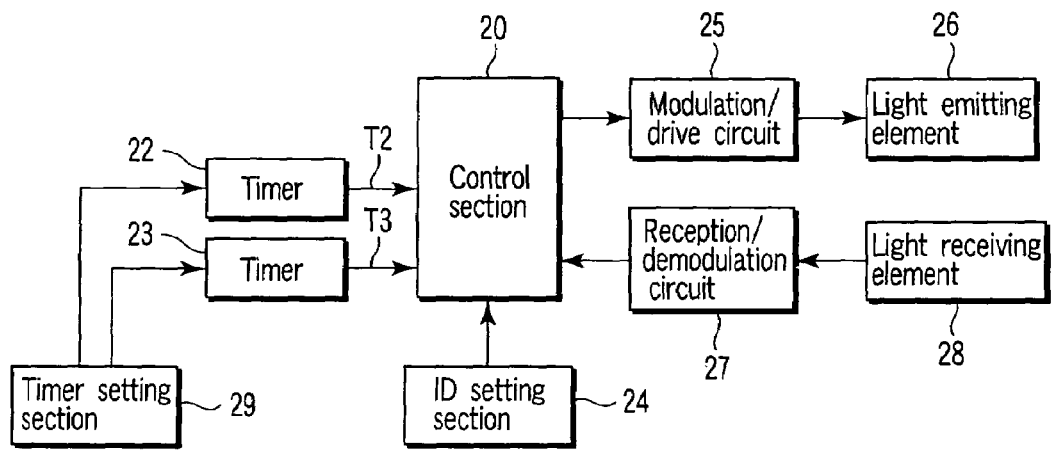
FIG. 4 is schematic block diagram of the control circuit of each of the remaining optical beacons of each embodiment.

All the remaining optical beacons #1 through #26 are sequentially operated to emit light upon receiving light emitted from an optical beacon other than themselves and comprise a control circuit as shown in FIG. 4. More specifically, timers 22, 23, an ID setting section 24, a modulation/drive circuit 25 and a reception/demodulation circuit 27 are connected to the control section 20 of each of the optical beacons #1 through #26.

In each of the optical beacons #1 through #26, the timer 22 counts for a predetermined time T2 for defining the light emitting operation for detecting the direction of the optical beacon. The timer 23 counts for a control time T3 from the time when the optical beacon adapted to emit light immediately before the own optical beacon starts emitting light for detection of direction to the time when the own optical beacon starts emitting light. The ID setting section 24 is a section for variably defining ID specific to the optical beacon by way of a manual operation. The modulation/drive circuit 25 modulates a carrier signal of a predetermined frequency under the control of the control section 10 and causes the light emitting element (light emitting diode) 26 to emit light by means of the modulated signal (pulse signal). The reception/demodulation circuit 27 receives light emitted from some other optical beacon by means of a light receiving element (e.g., a photodiode) 28 and extracts the start code, the ID code and the end code contained in the received light by demodulation and supplies them to the control section 20.

Figure 5:
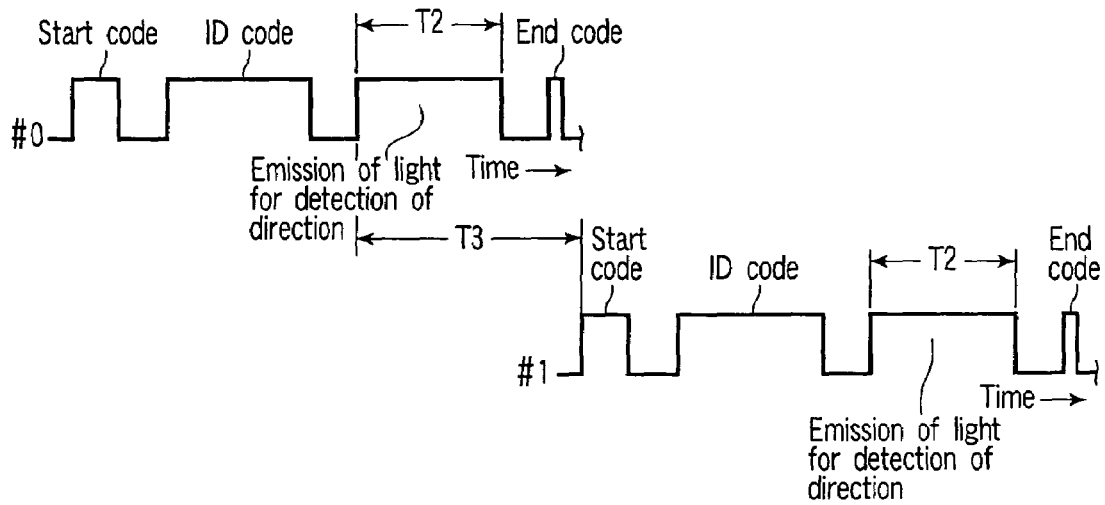
FIG. 5 is a timing chart illustrating the light emitting operation of each of the remaining optical beacons of each embodiment.

FIG. 5 is a timing chart illustrating part of the light emitting operation of each of the optical beacons #1 through #26 under the control of the corresponding control section 20.

Referring to FIG. 5, the optical beacon #1 constantly monitors the light it receives and the optical beacon that emitted the light according to the ID code extracted from the light and starts its operation after receiving the light emitted from the optical beacon #0 that immediately precedes it in terms of the light emitting sequence and additionally after the elapse of the control time T3 since the time when the optical beacon #0 started emitting light for detection of direction. It firstly emits light with a light emission pattern containing the start code, then emits light with a light emission pattern containing the ID code, subsequently continuously emits light for the predetermined time T2 for detection of direction according to the count of the timer 22 and finally emits light with a light emission pattern containing the end code. The emission of light for detection of direction is for allowing the mobile body 3 to reliably detect the direction of the optical beacon #1.

The optical beacon #2 constantly monitors the light it receives and the optical beacon that emitted the light according to the ID code extracted from the light and starts its operation after receiving the light emitted from the optical beacon #1 that immediately precedes it in terms of the light emitting sequence and additionally after the elapse of the control time T3 based on the count of the timer 23 since the time when the optical beacon #1 started emitting light for detection of direction. It firstly emits light with a light emission pattern containing the start code, then emits light with a light emission pattern containing the ID code, subsequently continuously emits light for the predetermined time T2 for detection of direction according to the count of the timer 22 and finally emits light with a light emission pattern containing the end code. The emission of light for detection of direction is for allowing the mobile body 3 to reliably detect the direction of the optical beacon #2.

The optical beacons #3 through #26 sequentially start operating to emit light like the above-described optical beacons #1 and #2.

Figure 6:
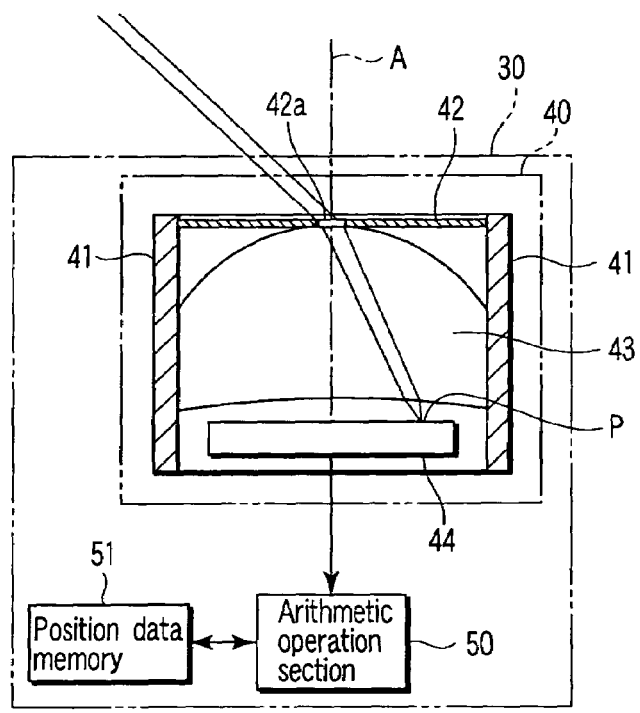
FIG. 6 is a schematic cross sectional view of the detection unit of the first embodiment, illustrating the configuration thereof.
Figure 7:
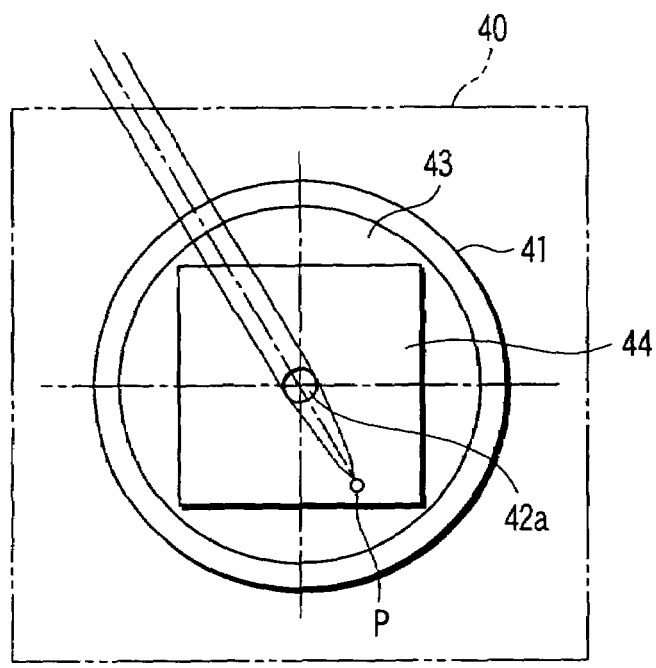
FIG. 7 is a schematic plan view of the detection unit of FIG. 6.

On the other hand, the mobile body 3 comprises a detection unit (detecting means) 30 as illustrated in FIGS. 6 and 7. The detection unit 30 includes a light receiving section 40, an arithmetic operation section 50 and a position data memory 51. The detection unit 30 identifies at least three optical beacons by referring to the ID code contained in each of the lights emitted from the optical beacons #0 through #26 and it receives and also detects the direction of light emitted from each of the optical beacons it identifies. Then, it detects the position of the mobile body 3 according to the outcome of detection and the position data corresponding to the ID codes and stored in the position data memory.

The light receiving section 40 includes a cylindrical cabinet 41 arranged on the upper part of the mobile body 3 with its axis vertical. The top opening of the cabinet 41 is closed by a light shielding plate 42 and light striking it from above is introduced into the cabinet 41 through of an aperture (diaphragm) 42a formed substantially at the center of the light shielding plate 42. Light introduced into the cabinet 41 is converged on a CMOS image sensor 44, which is a two-dimensional light receiving element, by means of a lens 43. In other words, a condensed light spot P is formed on the top surface of the CMOS image sensor 44.

The position data memory 51 stores the position data of the optical beacons #0 through #26 that are associated with the ID codes of the optical beacons #0 through #26.

The arithmetic operation section 50 has a decoding means for decoding the ID code contained in the light received by the CMOS image sensor 44 of the light receiving section 40, an identifying means for identifying at least three optical beacons by referring to the position data memory 51 according to the ID codes decoded by the decoding means, a detecting means for detecting the direction of light (light emitted for detection of direction) emitted from each of the optical beacons identified by the identifying means from the output of the CMOS image sensor and an arithmetic means for arithmetically determining the position of the mobile body 3 according to the directions of light detected by the detecting means.

The direction of light emitted from each of the optical beacons can be arithmetically determined from the central axis A and the condensed light spot P of the CMOS image sensor 44.

Figure 8:
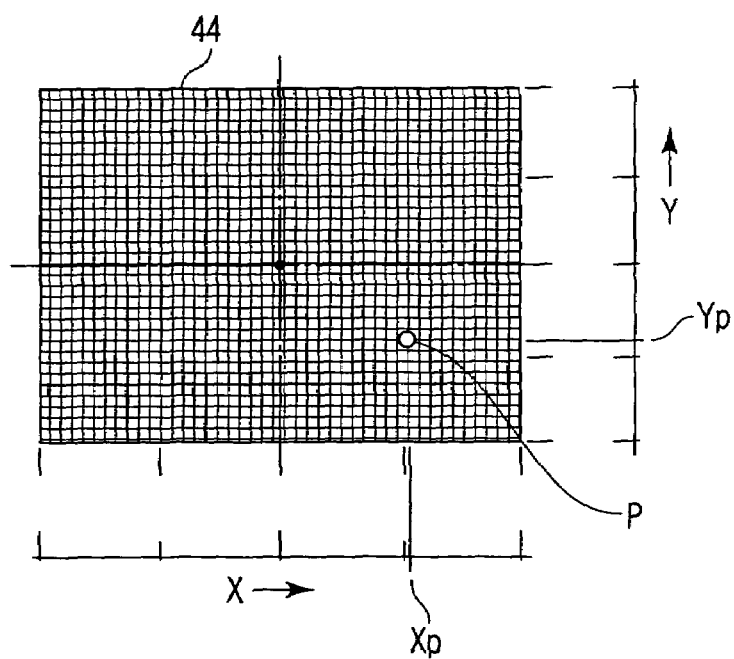
FIG. 8 is a schematic illustration of a condensed light spot formed on the CMOS image sensor of the first embodiment.

FIG. 8 is a schematic illustration of an example of condensed light spot that can be formed on the CMOS image sensor 44 of the first embodiment.

The X, Y coordinates, or Xp and Yp, of the pixel where the intensity of received light is highest out of all the pixels of the CMOS image sensor 44 are detected as the X, Y coordinates of the condensed light spot on the CMOS image sensor 44. The optical beacon that emits the received light is found in the angular direction determined by using Xp, Yp and the formula shown below.

$$\tan^{-1}(Yp/Xp)\pm\pi$$

As described above, a plurality of optical beacons #0 through #26 that are adapted to emit light with a light emission pattern containing an ID code are distributed and installed in the space for moving of the mobile body 3. On the other hand, the mobile body 3 is provided with a detection unit 30 adapted to identify at least three optical beacons from the ID codes contained in the lights emitted from the optical beacons #0 through #26 and detect the direction of light emitted from each of the identified optical beacons and then detect the position of the mobile body 3 according to the detected directions of light. Thus, this embodiment is free from the conventional cumbersome operation of initialization that has to be conducted after anchoring reflectors and placing the mobile body at a fixed point. Then, it is possible to reduce the load on the operator.

Additionally, it is no longer necessary to arrange a rotary-type laser radar on the mobile body 3 so that the embodiment is free from the problem that the mobile body 3 becomes large, can malfunction and involves large cost and can highly reliably detect the position of the mobile body 3.

The optical beacons #0 through #26 are not required to emit light constantly. In other words, they only have to emit light in a predetermined sequence so that it is possible to save power necessary for the optical beacons #0 through #26 to emit light to a great advantage from the viewpoint of power saving. Additionally, since the optical beacons #0 through #26 do not emit light simultaneously, the light receiving system of the mobile body 3 does not require sophistication and high cost to reliably identify the lights emitted from the optical beacons #0 through #26.

As the optical beacon #0 emits light periodically and the optical beacons #1 through #26 sequentially emit light upon receiving light emitted from an optical beacon other than itself (the optical beacon immediately preceding it in terms of light emitting sequence), it is not necessary to connect the optical beacons #0 through #26 by wires. The overall configuration can be simplified to reduce the cost of the system.

As identification information for identifying the immediately preceding optical beacon in terms of light emitting sequence, the ID code to be used for detecting the position of the mobile body 3 is utilized. Thus, the identification information for the mobile body 3 can also be used as identification information for the optical beacon that emits light next to simplify the configuration of the optical beacons.

If light emitted sequentially from the optical beacons #1 through #26 temporarily disappears for some reason or another, the optical beacon #0 emits light periodically so that the emission of light from the optical beacons #0 through #26 is reliably continued. From this point of view, therefore, it is possible to highly reliably detect the mobile body 3 for its position.

Since it is possible to alter any of the ID codes of optical beacons #0 through #26 by means of the ID defining sections 14, 24, the optical beacons #0 through #26 can be made to have a common configuration. While the optical beacon #0 has a configuration as shown in FIG. 2, the optical beacons #1 through #26 have a configuration as shown in FIG. 4. However, they differ from each other only in terms of the number of parts, control features and signs. In other words, they are same in terms of basic hardware. Of the components of the optical beacons, the two timers 11, 12 that the optical beacon #0 has and the two timers 22, 23 that each of the optical beacons #1 through #26 has can be commonly realized by means of same hardware when the functional features (counting times T1, T2, T3) of the timers are defined by referring to the ID codes set by the ID setting sections 14, 24. In this way, it is possible to reduce the cost by making the optical beacons #0 through #26 have configurations that are common to a large extent.

The mobile body 3 is so designed that it takes in the lights emitted from the optical beacons #0 through #26 to the light receiving section 40 thereof, converges them onto the CMOS image sensor 44 that is a two-dimensional light receiving element through of the lens 43 and detects the direction of each of the lights from the condensed light spot formed on the CMOS image sensor 44 in order to detect the position of the mobile body 3 from the directions of the detected lights. Thus, the configuration of the mobile body 3 is more compact than that of any known mobile body equipped with a rotary-type laser radar for scanning the surroundings of the mobile body by means of a laser beam. As the configuration of the mobile body 3 is made compact, the mobile body 3 can move smoothly in a congested space such as the inside of a supermarket.

The arithmetic operation section 50 of the detection unit 30 of the mobile body 3 decodes the ID code contained in the light emitted from each of the optical beacons from the output of the CMOS image sensor 44, identifies plane position coordinates of at least three optical beacons by referring to the position data stored in the position data memory 51 according to the ID codes it decodes, and detects the direction of light emitted from each of the identified optical beacons according to the output of the CMOS image sensor 44 in order to arithmetically determine the position of the mobile body 3 according to the detected directions of light. Thus, it is possible to detect the position of the mobile body 3 with a simple configuration.

[2] A second embodiment of the present invention will be described below.

Figure 9:
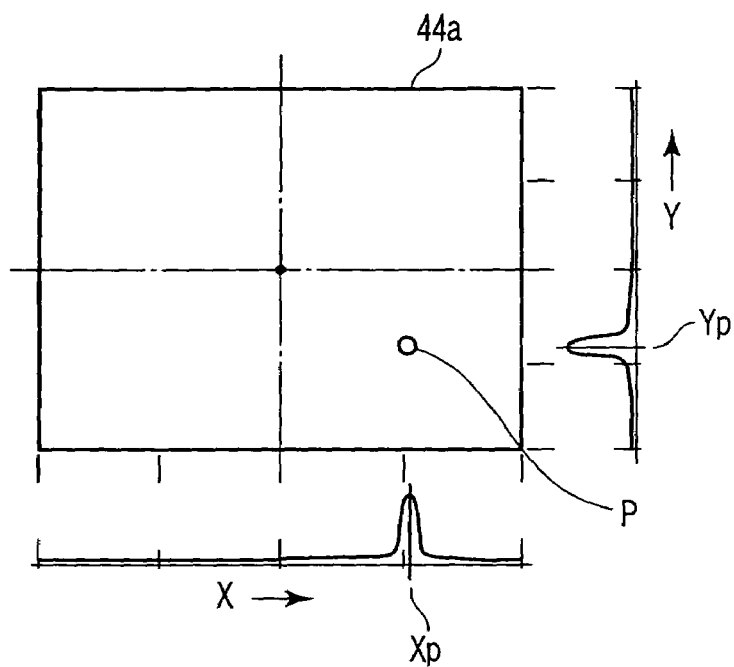
FIG. 9 is a schematic illustration of a condensed light spot formed on the CCD image sensor of the second embodiment.

The two-dimensional light receiving element of the light receiving section 40 of the mobile body 3 is not limited to a CMOS image sensor 44 and a CCD image sensor 44a as shown in FIG. 9 may alternatively be used. FIG. 9 also shows the condensed light spot P of the CCD image sensor 44a and the output distribution in the X, Y directions of each pixel of the CCD image sensor 44a.

The X, Y coordinates, or Xp and Yp, of the pixel where the intensity of received light is highest out of all the pixels of the CCD image sensor 44a are detected as the X, Y coordinates of the condensed light spot on the CCD image sensor 44a. The optical beacon that emits the received light is found in the angular direction determined by using Xp, Yp and the formula shown below.

$$\tan^{-1}(Yp/Xp) \pm \pi$$

As the X, Y coordinates of the pixel where the intensity of received light is highest out of all the pixels of the CCD image sensor 44a are detected as the X, Y coordinates of the condensed light spot, it is possible to accurately detect the X, Y coordinates of the condensed light spot of light emitted from any of the optical beacons #0 through #26. Then, it is possible to accurately detect the direction of light emitted from any of the optical beacons. Thus, the accuracy of detecting the position of the mobile body 3 is improved.

The technique of detecting the X, Y coordinates of the pixel where the intensity of received light is highest as the X, Y coordinates of the condensed light spot is also applicable to a mobile body comprising a CMOS image sensor 44 as two-dimensional light receiving element as in the case of the first embodiment.

Figure 10:
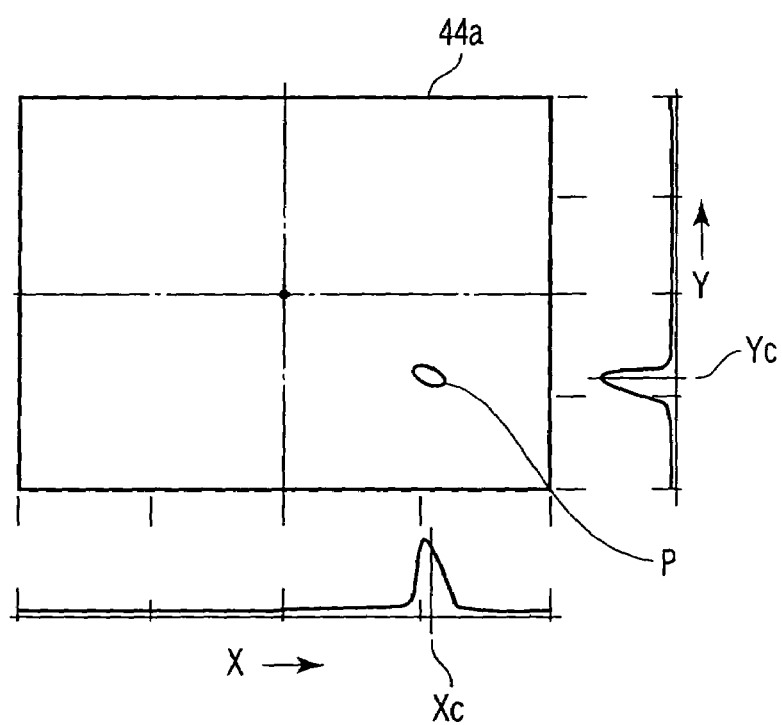
FIG. 10 is a schematic illustration of a modified condensed light spot formed on the CCD image sensor of the second embodiment.

As shown in FIG. 10, there may be occasions where the condensed light spot on the CCD image sensor 44a is not a proper circle. If such is the case, it is more accurate to detect the X, Y coordinates, or Xc, Yc, of the pixel that corresponds to the position of the center of gravity of the image of the condensed light spot on the CCD image sensor 44a out of all the pixels of the CCD image sensor 44a as the X, Y coordinates of the condensed light spot on the CCD image sensor 44a. Then, the optical beacon that emits the received light is found in the angular direction determined by using Xc, Yc and the formula shown below.

$$\tan^{-1}(Yc/Xc) \pm \pi$$

Thus, even when the condensed light spot is not a proper circle, it is possible to accurately detect the X, Y coordinates of the condensed light spot of light emitted from any of the optical beacons #0 through #26. Then, it is possible to accurately detect the direction of light emitted from any of the optical beacons. Thus, the accuracy of detecting the position of the mobile body 3 is improved.

The technique of detecting the X, Y coordinates of the pixel that corresponds to the position of the center of gravity of the image of the condensed light spot as the X, Y coordinates of the condensed light spot is also applicable to a mobile body comprising a CMOS image sensor 44 as two-dimensional light receiving element as in the case of the first embodiment.

Otherwise, the second embodiment is identical to the first embodiment in terms of configuration, effects and advantages and hence will not be described any further.

[3] A third embodiment of the present invention will be described below.

The two-dimensional light receiving element of the light receiving section 40 of the mobile body 3 is not limited to a CMOS image sensor 44 and a CCD image sensor 44a and a position sensor 44b as shown in FIG. 11, which is also called a PSD (position sensitive detector), may alternatively be used. The position sensor 44b is adapted to detect the position of the center of gravity of the intensity of received light at the condensed light spot P by utilizing the surface resistance of a photodiode and output a signal that corresponds to the position of the center of gravity.

If the X, Y coordinates of the position of the center of gravity of the intensity of received light at the condensed light spot P is Xc, Yc, the following formulas hold true.

$$\frac{(X2+Y1)-(X1+Y2)}{X1+X2+Y1+Y2} = \frac{2Xc}{L}$$

$$\frac{(X2+Y2)-(X1+Y1)}{X1+X2+Y1+Y2} = \frac{2Yc}{L}$$

It is possible to determine Xc, Yc from the above formulas. Thus, the optical beacon that emits the received light is found in the angular direction determined by using Xc, Yc and the formula shown below.

$$\tan^{-1}(Yc/Xc) \pm \pi$$

Otherwise, the third embodiment is identical to the first embodiment in terms of configuration, effects and advantages and hence will not be described any further.

[4] A fourth embodiment of the present invention will be described below.

Referring to FIG. 12, the CMOS image sensor 44 of the light receiving section 40 of this embodiment is found between the rear surface of the lens 43 and the focal position (back focus fB) of the lens 43.

When using the light receiving system of the light receiving section of the present invention, it should be noted that the system differs from ordinary optical systems where paraxial rays are used as reference and the focused point of marginal rays is important for the system. This is because the light receiving section 40 is installed in the mobile body 3 and not placed at a fixed position relative to any light emitting section in order to receive paraxial rays. If a wide angle lens is used, distortions cannot be eliminated from the marginal zone and a large curvature of image is involved. If such aberrations are to be removed only by means of an optical system, the entire arrangement will be very large and costly.

However, with the above described arrangement where the CMOS image sensor 44 is placed between the rear surface of the lens 43 and the focal position (back focus fB) of the lens 43, it is possible to efficiently converge marginal rays that take a major part of rays of light entering the light receiving section 40 onto the CMOS image sensor 44 and accurately detect the coordinates of the condensed light spot P by means of a single lens such as the lens 43 or by means of a simple optical system having only several lenses.

A filter 45 for blocking visible light by way of infrared rays is arranged on the light path of the light receiving section 40 typically between the light shielding plate 42 and the lens 43.

Due to the filter 45 arranged there, it is possible to receive only infrared rays emitted from any of the optical beacons #0 through #26 efficiently and highly sensitively.

Note that, it is possible to use a band pass filter to reduce noise.

Otherwise, the fourth embodiment is identical to the first embodiment in terms of configuration, effects and advantages and hence will not be described any further.

[5] A fifth embodiment of the present invention will be described below.

Figure 13:
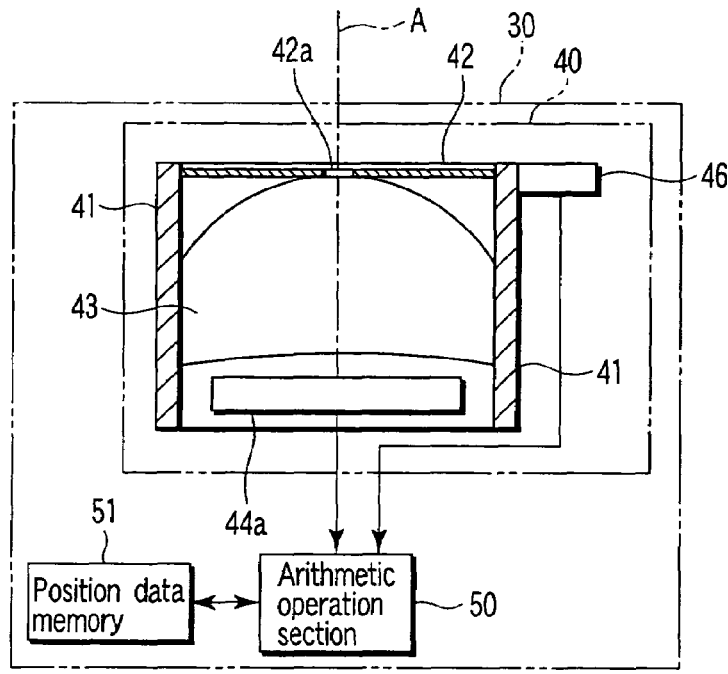
FIG. 13 is a schematic illustration of the light receiving section of the detection unit of the fifth embodiment, showing the configuration thereof.

As shown in FIG. 13, a CCD image sensor 44*a* is adopted as a two-dimensional light receiving element of the light receiving section 40 of this embodiment. Additionally, a photodiode 46 is typically arranged on the outer peripheral surface of the cabinet 41 of the light receiving section 40, which is more responsive than a CCD image sensor 44*a*, as second light receiving element for detecting an ID code. Then, the output of the photodiode 46 is supplied to the arithmetic operation section 50. As a result of arranging a photodiode 46, the light receiving section 40 can highly responsively and reliably recognize light containing an ID code.

The two-dimensional light receiving element of the light receiving section 40 is not limited to a CCD image sensor 44*a* and a CMOS image sensor 44 or a position sensor 44*b* may alternatively be used.

Since it is not easy for a CCD image sensor to detect an ID code at an appropriate timing for reading it, it is desirable to arrange a photodiode 46 dedicated to detect an ID code.

Otherwise, the fifth embodiment is identical to the first embodiment in terms of configuration, effects and advantages and hence will not be described any further.

[6] A sixth embodiment of the present invention will be described below.

Figure 14:
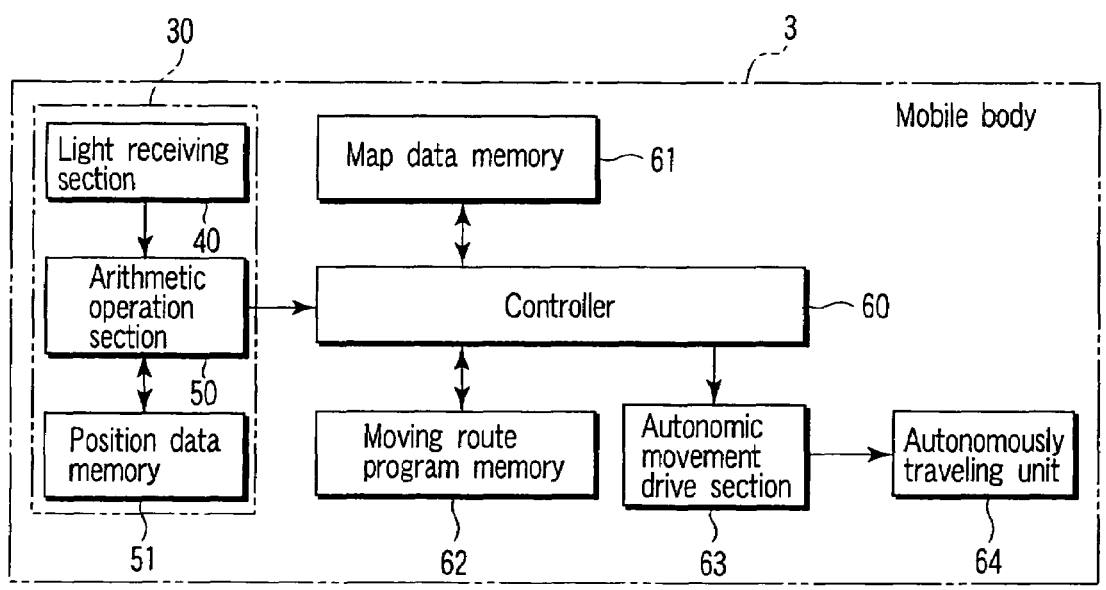
FIG. 14 is a schematic block diagram of the detection unit of the sixth embodiment.

An autonomously travelable mobile body such as a mobile robot is illustrated in FIG. 14 as mobile body 3.

The mobile body 3 has a controller 60. A detection unit 30, a map data memory 61, a moving route program memory 62, an autonomic movement drive section 63 are connected to the controller 60.

The map data memory 61 stores map data in the space for moving in the building 1 where optical beacons are arranged. The moving route program memory 62 stores a moving route program for specifying a moving route for the mobile body 3. The autonomic movement drive section 63 drives the autonomously traveling unit 64 according to the command from the controller 60.

The controller 60 controls the operation of driving an autonomously traveling unit 64 according to the moving route program stored in the moving route program memory 62 and by collating the outcome of detection of the detection unit 30 (the position of the mobile body 3 and the map data stored in the map data memory 61, by way of the autonomic movement drive section 63. With this arrangement, the mobile body 3 can move, following a desired route. In this way, a position detection system according to the invention can be applied to an autonomously travelable mobile body.

Otherwise, the sixth embodiment is identical to the first embodiment in terms of configuration, effects and advantages and hence will not be described any further.

[7] A seventh embodiment of the present invention will be described below.

A large number of mobile bodies 3*a*, 3*b*, . . . 3*n* such as shopping trolleys are provided as shown in FIG. 15. Each of the mobile bodies 3*a*, 3*b*, . . . 3*n* has a radio transmission unit 55 in addition to a detection unit 30 and can move freely in the space for moving in a building 1, which may be a supermarket. The radio transmission unit 55 transmits the outcome of detection of the detection unit 30 (the position of the mobile body) wirelessly.

On the other hand, a server 71 is installed in management center 70 that is separated from the building 1. A radio reception unit 72, an operation unit 73, a map data memory 74, an accumulation memory 75, a display unit 76 that is an output means and a printer 77 that is also an output means are connected to the server 71.

The radio reception unit 72 receives the outcome of detection transmitted from the radio transmission unit 55. The map data memory 74 stores map data of the space for moving in the building 1. The accumulation memory 75 accumulatively stores the positions of the mobile bodies 3*a*, 3*b*, . . . 3*n*.

The server 71 has a control means for accumulating and storing the outcomes of detection it receives at the radio reception unit 72 in the accumulation memory 75 and a control means for outputting the contents of the accumulation memory 75, associating them with the map data in the map data memory 74, from the display unit 76 or the printer 77.

With the above described arrangement, the position of each of the mobile bodies 3*a*, 3*b*, . . . 3*n* is detected and the detected position is accumulatively stored in the accumulation memory 75 in the management center 70.

It is possible to output the contents of the accumulation memory 75 from the display unit 76 or the printer 77, associating them with the map data stored in the map data memory 74 by operating the operation unit 73. Then, as a result, it is possible to individually confirm the moving routes of the mobile bodies 3*a*, 3*b*, . . . 3*n* in the space for moving in the building 1.

Otherwise, the seventh embodiment is identical to the first embodiment in terms of configuration, effects and advantages and hence will not be described any further.

[8] A eighth embodiment of the present invention will be described below.

Figure 16:
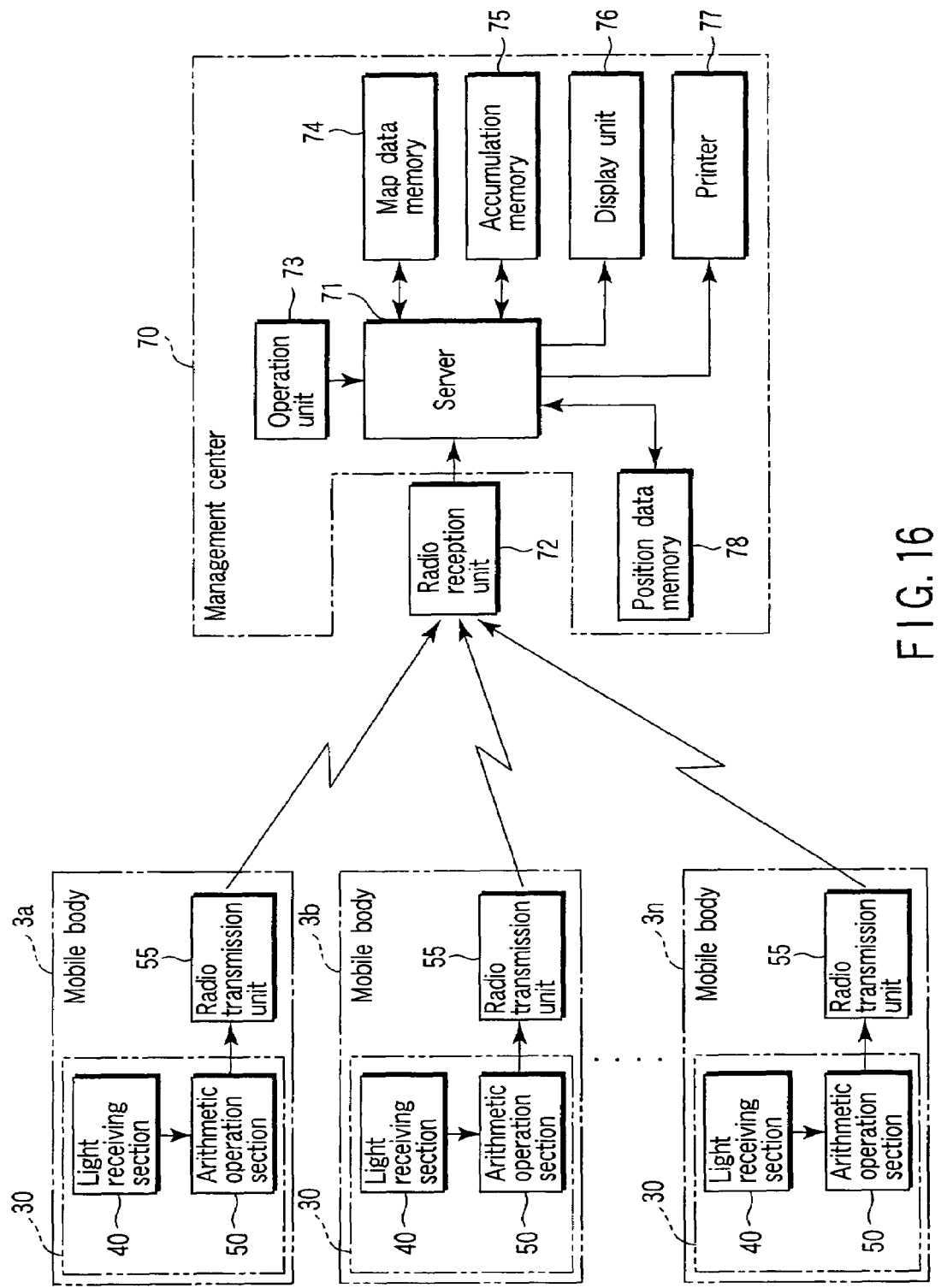
FIG. 16 is a schematic block diagram of the control circuit of the entire eighth embodiment.

A large number of mobile bodies 3*a*, 3*b*, . . . 3*n* such as shopping trolleys are provided as shown in FIG. 16. The detection unit 30 of each of the mobile bodies 3*a*, 3*b*, . . . 3*n* has only a light receiving section 40 and an arithmetic operation section 50 and does not have a position data memory 51 unlike the preceding embodiments. The arithmetic operation section 50 is only adapted to detect the direction of each of the plurality of lights it receives at the light receiving section 40 and decode the ID code contained in the light but does not have a functional feature of detecting the positions of the mobile bodies 3*a*, 3*b*, . . . 3*n*.

Each of the mobile bodies 3*a*, 3*b*, . . . 3*n* has a radio transmission unit 55 in addition to a detection unit 30. The radio transmission unit 55 wirelessly transmits the outcomes of detection and decoding of the arithmetic operation section 50.

On the other hand, a server 71 is installed in the management center 70 that is separated from the building 71. A radio reception unit 72, an operation unit 73, a map data memory 74, an accumulation memory 75, a display unit 76 that is an output means, a printer 77 that is also an output means and a position data memory 78 are connected to the server 71.

The radio reception unit 72 receives the outcome of detection and that of decoding transmitted from the radio transmission unit 55. The map data memory 74 stores map data of the space for moving in the building 1. The accumulation memory 75 accumulatively stores the positions of the mobile bodies 3a, 3b, . . . 3n. The position data memory 78 stores the position data of the optical beacons #0 through #26 that are associated with the ID codes of the optical beacons #0 through #26.

The server 71 has a determining means for determining the position (the coordinate values thereof) of each of the optical beacons that emits the light received at the mobile bodies 3a, 3b, . . . 3n by referring to the position data memory 78 according to the outcome of decoding (each ID code) received by the radio reception unit 72, a detecting means for detecting the position of each of the mobile bodies 3a, 3b, . . . 3n by arithmetic operations conducted according to the outcome of determination of the determining means and that of detection as received at the radio reception unit 72, a control means for accumulatively storing the outcome of detection of the detecting means in the accumulation memory 75 and a control means for outputting the contents of the accumulation memory 75 from the display unit 76 or the printer 77, associating them with the map data stored in the map data memory 74.

With the above described arrangement, the position of each of the mobile bodies 3a, 3b, . . . 3n is detected at the server 71 and the detected position is accumulatively stored in the accumulation memory 75 in the management center 70.

It is possible to output the contents of the accumulation memory 75 from the display unit 76 or the printer 77, associating them with the map data stored in the map data memory 74 by operating the operation unit 73. Then, as a result, it is possible to individually confirm the moving routes of the mobile bodies 3a, 3b, . . . 3n in the space for moving in the building 1.

Otherwise, the eighth embodiment is identical to the first embodiment in terms of configuration, effects and advantages and hence will not be described any further.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position detection system comprising:
a plurality of light emitting sections distributed in the space in which of one or more mobile bodies are moved and adapted to emit light sequentially in respective light emission patterns containing respective specific pieces of identification information; and
one or more detection sections arranged in the mobile body or respectively in the mobile bodies, which identify at least three of the light emitting sections according to the identification information contained in the light emitted from each of the light emitting sections, detect the direction of light emitted from each of the identified light emitting sections, and detect the position of the mobile body or respectively the mobile bodies according to the direction of light emitted;
wherein at least one of the light emitting sections emits light upon receiving light from any other light emitting section.

2. The system according to claim 1, wherein
at least one of the light emitting sections periodically emits light and the remaining light emitting sections sequentially emit light upon receiving light from any other light emitting section.

3. The system according to claim 2, wherein
the remaining light emitting sections grasp the own position in the light emitting sequence according to the identification information contained in the lights received from any other light emitting sections.

4. The system according to claim 1, wherein
the light emitting sections include setting means for variably setting the own identification information.

5. The system according to claim 1, wherein
the one or more detection sections include:
a light receiving section which includes a lens and a two-dimensional light receiving element and converges light coming from above on the two-dimensional light receiving element through the lens;
a position data memory which stores position data of each of the light emitting sections associated with identification information of the light emitting sections; and
an arithmetic operation section which decodes the pieces of identification information contained in the respective lights received by the two-dimensional light receiving element, identifies at least three light emitting sections by referring to the position data memory according to each of the decoded pieces of identification information and arithmetically determines the position of the one or more mobile bodies according to the direction of light emitted from each of the identified light emitting sections.

6. The system according to claim 5, wherein
the arithmetic operation section includes:
decoding means for decoding the identification information contained in each of the lights received by the two-dimensional light receiving element according to the output of the two-dimensional light receiving element;
identifying means for identifying at least three light emitting sections by referring to the position data memory according to each of the pieces of identification information decoded by the decoding means;
detecting means for detecting the direction of light emitted from each of the light emitting sections identified by the identifying means from the output of the two-dimensional light receiving element; and
arithmetic means for arithmetically determining the position of the one or more mobile bodies according to the directions of light detected by the detecting means.

7. The system according to claim 5, wherein
the light receiving section includes a second light receiving element for receiving light coming from above, in addition to the two-dimensional light receiving element; and
the arithmetic operation section includes:
decoding means for decoding the identification information contained in each of the lights received from each of the light emitting sections according to the output of the second light receiving element;
identifying means for identifying at least three light emitting sections by referring to the position data memory according to each of the pieces of identification information decoded by the decoding means;
detecting means for detecting the direction of light emitted from each of the light emitting sections identified by the identifying means from the output of the two-dimensional light receiving element; and arithmetic means for arithmetically determining the position of the one or more mobile bodies according to the directions of light detected by the detecting means.

8. The system according to claims 6 or 7, wherein
the two-dimensional light receiving element is a CMOS image sensor or a CCD image sensor; and
the detecting means detects the X, Y coordinates of the condensed light spot on the CMOS image sensor or the CCD image sensor, and detects the X, Y coordinates of the pixel where the intensity of received light is highest out of all the pixels of the CMOS image sensor or the CCD image sensor, as the X, Y coordinates of the condensed light spot on the CMOS image sensor or the CCD image sensor, whichever appropriate.

9. The system according to claims 6 or 7, wherein
the two-dimensional light receiving element is a CMOS image sensor or a CCD image sensor; and
the detecting means detects the X, Y coordinates of the condensed light spot on the CMOS image sensor or the CCD image sensor, and detects the X, Y coordinates of the pixel that corresponds to the position of the center of gravity of the image on the CMOS image sensor out of all the pixels of the CMOS image sensor or the CCD image sensor, as the X, Y coordinates of the condensed light spot on the CMOS image sensor or the CCD image sensor, whichever appropriate.

10. The system according to claims 6 or 7, wherein
the two-dimensional light receiving element is a position sensor for detecting the position of the center of gravity of the intensity of received light at a condensed light spot; and
the detecting means detects the position of the center of gravity as detected by the position sensor as the X, Y coordinates of the condensed light spot.

11. The system according to claim 5, wherein
the two-dimensional light receiving element of the light receiving section is arranged at a position between the rear surface of the lens and the focal position of the lens.

12. The system according to claim 1, further comprising:
an autonomously traveling unit arranged in the one or more mobile body;
a map data memory arranged in the one or more mobile bodies and storing map data of the space in which of the one or more mobile bodies are moved;
a moving route program memory arranged in the one or more mobile bodies and storing a moving route program for specifying a moving route of the one or more mobile bodies; and
a controller arranged in the one or more mobile bodies and adapted to drive and control the autonomously traveling unit according to the moving route program stored in the moving route program memory and by collating the outcome of detection of the detecting means and the map data stored in the map data memory.

13. A position detection system comprising:
a plurality of light emitting sections distributed in the space in which of one or more mobile bodies are moved, and adapted to emit light sequentially in respective light emission patterns containing respective specific pieces of identification information;
a light receiving section arranged in the one or more mobile bodies and adapted to receive light emitted from each of the light emitting sections;
a detection section arranged in the one or more mobile bodies and adapted to identify at least three light emitting sections according to the pieces of identification information contained in the respective lights received by the light receiving section and detect the direction of light emitted from each of the identified light emitting sections;
a radio transmission section arranged in the one or more mobile bodies and adapted to wirelessly transmit the outcome of identification and the outcome of detection of the detection section;
a radio reception section arranged in a management center and adapted to receive the outcome of identification and the outcome of detection transmitted from the radio transmission section;
an accumulation memory arranged in the management center and adapted to accumulatively store the positions of the one or more mobile bodies; and
a server arranged in the management center and adapted to arithmetically determining the positions of the one or more mobile bodies according to the outcome of identification and the outcome of detection as received at the radio reception section and accumulatively store the outcome of the arithmetic operations in the accumulation memory.

14. The system according to claim 13, further comprising:
a map data memory arranged in the management center and adapted to store the map data of the space in which of the one or more mobile bodies are moved: and
a control section arranged in the server and adapted to output the contents of the accumulation memory associated with the map data stored in the map data memory.

\* \* \* \* \*